(12) United States Patent
Matsuzawa

(10) Patent No.: US 10,798,353 B2
(45) Date of Patent: *Oct. 6, 2020

(54) CALIBRATION APPARATUS, CALIBRATION METHOD, OPTICAL APPARATUS, IMAGE CAPTURING APPARATUS, AND PROJECTION APPARATUS

(71) Applicant: OLYMPUS CORPORATION, Tokyo (JP)

(72) Inventor: Toshiaki Matsuzawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,814

(22) Filed: Sep. 12, 2019

(65) Prior Publication Data

US 2020/0007836 A1  Jan. 2, 2020

Related U.S. Application Data

(63) Continuation of application No. PCT/JP2018/005008, filed on Feb. 14, 2018.

(30) Foreign Application Priority Data

Mar. 21, 2017  (JP) .................................. 2017-054559

(51) Int. Cl.
*H04N 9/31* (2006.01)
*H04N 13/246* (2018.01)
(Continued)

(52) U.S. Cl.
CPC ............. *H04N 9/3185* (2013.01); *G06T 7/70* (2017.01); *G06T 7/80* (2017.01); *H04N 13/246* (2018.05); *G06T 2200/04* (2013.01)

(58) Field of Classification Search
None
See application file for complete search history.

(56) References Cited

U.S. PATENT DOCUMENTS 6,574,361 B1 * 6/2003 Kawakami ............. G06T 7/593
 382/154
7,983,476 B2 * 7/2011 Tate .................... H04N 1/00002
 382/154
(Continued)

FOREIGN PATENT DOCUMENTS

EP  1434169 A2  6/2004
JP  2002-202122 A  7/2002
(Continued)

OTHER PUBLICATIONS

International Search Report dated Apr. 17, 2018 issued in PCT/JP2018/005008.
(Continued)

*Primary Examiner* — Jefferey E Harold
*Assistant Examiner* — Mustafizur Rahman
(74) *Attorney, Agent, or Firm* — Scully, Scott, Murphy & Presser, P.C.

(57) ABSTRACT

A calibration apparatus is configured to acquire calibration data indicating a correspondence between two-dimensional pixel coordinates of the image-conversion device and three-dimensional world coordinates of the world coordinate space and calculate parameters by fitting, to the acquired data, a camera model in which two coordinate values of the two-dimensional pixel coordinates are expressed as a function of three coordinate values of the three-dimensional world coordinates. When a projection relationship between an angle of view and an image height of the optical system is roughly expressed by a predetermined expression by using a projection focal distance, the apparatus is configured to convert three-dimensional world coordinates of the acquired (Continued)

data to two-dimensional coordinates and, subsequently, by fitting a camera model in which the two coordinate values of the two-dimensional pixel coordinates are expressed as a function of two coordinate values of the two-dimensional coordinates, calculate the parameters of the camera model.

22 Claims, 8 Drawing Sheets

(51) Int. Cl.
  *G06T 7/80* (2017.01)
  *G06T 7/70* (2017.01)

(56) References Cited

U.S. PATENT DOCUMENTS

| | | | | |
|---|---|---|---|---|
| 8,170,329 | B2* | 5/2012 | Seko | G06K 9/3216 |
| | | | | 382/154 |
| 8,743,214 | B2* | 6/2014 | Grossmann | H04N 17/002 |
| | | | | 348/188 |
| 8,872,897 | B2* | 10/2014 | Grossmann | G06T 7/80 |
| | | | | 348/46 |
| 9,996,931 | B2* | 6/2018 | Yamamoto | B23Q 17/2233 |
| 10,127,687 | B2* | 11/2018 | Matsuzawa | H04N 5/232 |
| 10,142,544 | B1* | 11/2018 | Engel | H04N 5/2253 |
| 10,613,338 | B2* | 4/2020 | Blonde | G02B 27/0012 |
| 2004/0066454 | A1* | 4/2004 | Otani | G01C 11/06 |
| | | | | 348/188 |
| 2004/0170315 | A1 | 9/2004 | Kosaka et al. | |
| 2008/0031514 | A1* | 2/2008 | Kakinami | G06T 7/80 |
| | | | | 382/154 |
| 2009/0129628 | A1* | 5/2009 | Mirbach | G06T 7/73 |
| | | | | 382/103 |
| 2010/0201809 | A1* | 8/2010 | Oyama | G01C 3/14 |
| | | | | 348/135 |
| 2012/0002057 | A1* | 1/2012 | Kakinami | G06T 7/85 |
| | | | | 348/187 |
| 2012/0287240 | A1* | 11/2012 | Grossmann | G06T 7/80 |
| | | | | 348/46 |
| 2014/0085409 | A1* | 3/2014 | Zhang | H04N 5/23238 |
| | | | | 348/36 |
| 2014/0267602 | A1* | 9/2014 | Tzur | H04N 13/122 |
| | | | | 348/43 |
| 2014/0340508 | A1* | 11/2014 | Yamamoto | G06T 7/73 |
| | | | | 348/94 |
| 2015/0189267 | A1* | 7/2015 | Kaji | G06T 3/0093 |
| | | | | 348/187 |
| 2017/0195589 | A1* | 7/2017 | Kovacovsky | H04N 5/2354 |
| 2017/0221226 | A1* | 8/2017 | Shen | G06T 7/80 |
| 2017/0243374 | A1* | 8/2017 | Matsuzawa | G06T 7/80 |
| 2017/0287166 | A1* | 10/2017 | Claveau | H04N 17/002 |
| 2018/0182083 | A1* | 6/2018 | Natroshvili | G06K 9/4628 |
| 2019/0073795 | A1* | 3/2019 | Matsuzawa | H04N 5/232 |
| 2019/0180476 | A1* | 6/2019 | Matsuzawa | H04N 17/002 |

FOREIGN PATENT DOCUMENTS

| | | |
|---|---|---|
| JP | 2005-260753 A | 9/2005 |
| JP | 3735344 B2 | 1/2006 |
| JP | 2016-105577 A | 6/2016 |

OTHER PUBLICATIONS

"Digital Image Processing, Revised New Version", Computer Graphic Arts Society (Mar. 9, 2015), pp. 308-317, with partial translation.
Brown, D.C., "Close-Range Camera Calibration", Photogrammetric Engineering (1971), vol. 37, No. 8, pp. 855-866.

* cited by examiner

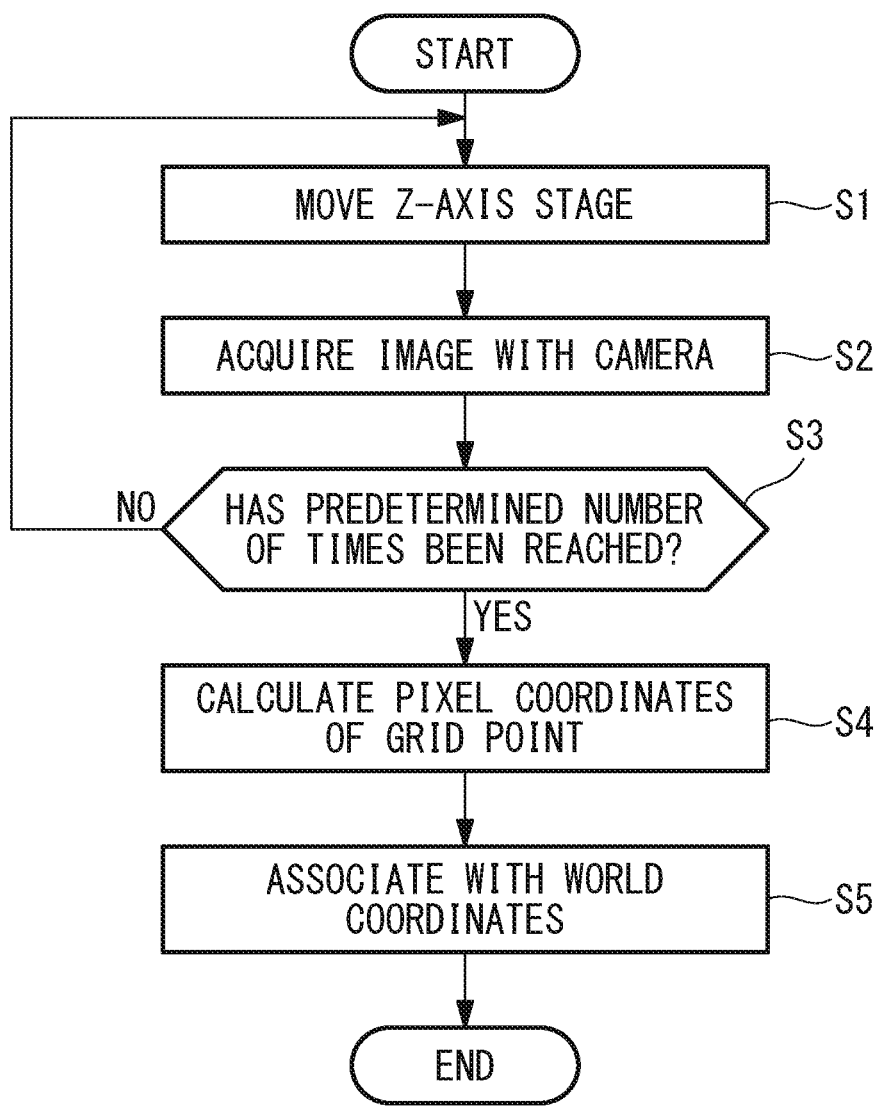

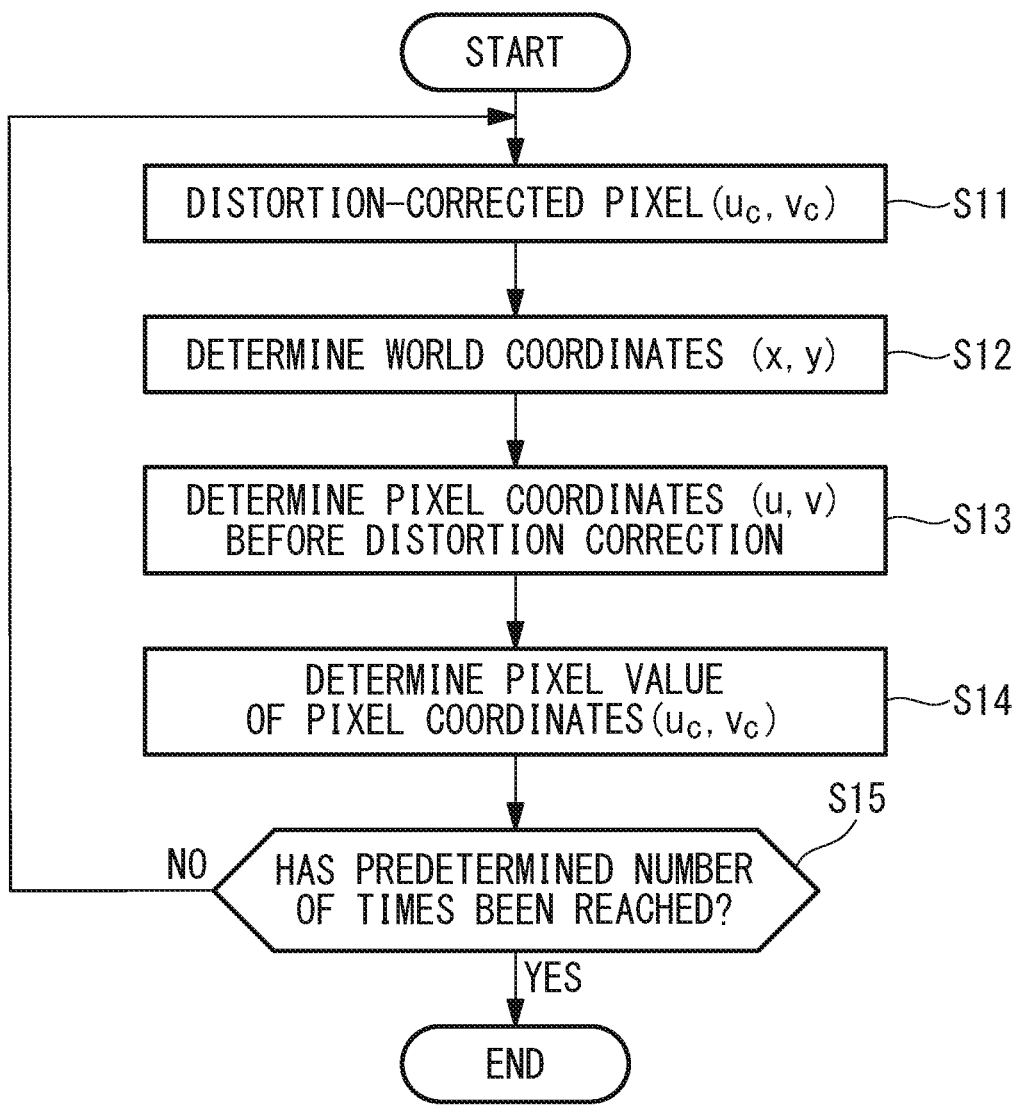

CALIBRATION APPARATUS, CALIBRATION METHOD, OPTICAL APPARATUS, IMAGE CAPTURING APPARATUS, AND PROJECTION APPARATUS

CROSS-REFERENCE TO RELATED APPLICATIONS

This is a continuation of International Application PCT/JP2018/005008 which is hereby incorporated by reference herein in its entirety.

This application claims the benefit of Japanese Patent Application No. 2017-054559, the content of which is incorporated herein by reference.

TECHNICAL FIELD

The present invention relates to a calibration apparatus, a calibration method, an optical apparatus, an image capturing apparatus, and a projection apparatus.

BACKGROUND ART

There is a known calibration apparatus that calibrates a camera of an image capturing apparatus or a projection apparatus (for example, see Patent Literature 1, and Non Patent Literatures 1 and 2).

A camera model includes a plurality of unknown parameters (camera parameters), and, as a result of determining the camera parameters by means of a calibration apparatus, it is possible to mathematically obtain principal rays of the real world corresponding to two-dimensional coordinates (pixel coordinates) of an image. Alternatively, it is possible to obtain pixel coordinates corresponding to three-dimensional coordinates of the real world (hereinafter referred to as the world coordinates). Note that the above-described principal rays are also referred to as back-projection lines or lines of sight corresponding to the pixel coordinates.

Camera calibration in the related art disclosed in Patent Literature 1 and Non Patent Literature 1 will now be described. Camera calibration is performed by means of the following procedures by using a mathematical camera model that expresses the process by which three-dimensional coordinates of the real world are acquired by a camera, thus being converted to two-dimensional coordinates of the image.

First, world coordinates $(x, y, z)$ are projected to normalized image-plane coordinates $(u_p, v_p)$ by using Eq. 1.

$$\begin{cases} u_p = \dfrac{r_{11}x + r_{12}y + r_{13}z + t_x}{r_{31}x + r_{32}y + r_{33}z + t_z} \\ v_p = \dfrac{r_{21}x + r_{22}y + r_{23}z + t_y}{r_{31}x + r_{32}y + r_{33}z + t_z} \end{cases} \quad \{\text{Eq. 1}\}$$

$$R = \begin{pmatrix} r_{11} & r_{12} & r_{13} \\ r_{21} & r_{22} & r_{23} \\ r_{31} & r_{32} & r_{33} \end{pmatrix}, \quad \{\text{Eq. 2}\}$$

$$T = \begin{pmatrix} t_x \\ t_y \\ t_z \end{pmatrix}$$

Here, a rotation matrix R and a translation vector T in Eq. 2 represent three-dimensional coordinate conversion from the world coordinates to the camera coordinates. These are values representing the position and attitude of a camera with respect to the world coordinates, referred to as external parameters. Note that Eq. 1 is an expression based on the assumption that all principal rays intersect at an optical center of the camera. Next, by using Eq. 3, $(u_d, v_d)$ in which distortion is applied to normalized image-plane coordinates $(u_p, v_p)$ are determined.

$$\begin{cases} u_d = u_p + g_1(u_p^2 + v_p^2) + g_3 u_p^2 + g_4 u_p v_p + k_1 u_p(u_p^2 + v_p^2) \\ v_d = v_p + g_2(u_p^2 + v_p^2) + g_3 u_p v_p + g_4 v_p^2 + k_1 v_p(u_p^2 + v_p^2) \end{cases} \quad \{\text{Eq. 3}\}$$

Here, $g_1$, $g_2$, $g_3$, $g_4$, and $k_1$ are distortion parameters. Furthermore, by using Eq. 4, $(u_d, v_d)$, which are the normalized image-plane coordinates to which distortion has been applied, are converted to pixel coordinates $(u, v)$ determined on the basis of pixel units.

$$\begin{cases} u = \alpha_u u_d + u_0 \\ v = \alpha_v v_d + v_0 \end{cases} \quad \{\text{Eq. 4}\}$$

As has been described above, a standard camera model represents, by means of Eq. 1 to Eq. 4, the conversion from the world coordinates $(x, y, z)$, which are based on image acquisition by a camera, to the pixel coordinates $(u, v)$.

Note that parameters $\alpha_u$, $\alpha_v$, $u_0$, $v_0$, $g_1$, $g_2$, $g_3$, $g_4$, and $k_1$ in Eq. 3 and Eq. 4 are referred to as internal parameters because these parameters represent the characteristics of a camera itself.

Distortion parameters are variously defined in accordance with the usage. For example, although Eq. 3 is a model in which distortion is taken into consideration up to third order, a model in which higher-order terms, such as fifth order, seventh order, and so forth, are additionally included is also employed. Among these models, Brown's model in Non Patent Literature 2, indicated by Eq. 5, is a typical distortion model.

$$\begin{pmatrix} u_d \\ v_d \end{pmatrix} = \begin{pmatrix} u_p \\ v_p \end{pmatrix} + (k_1 \rho_p^2 + k_2 \rho_p^4 + k_3 \rho_p^6 + \ldots)\begin{pmatrix} u_p \\ v_p \end{pmatrix} + \quad \{\text{Eq. 5}\}$$

$$\left[ p_1 \begin{pmatrix} \rho_p^2 + 2u_p^2 \\ 2u_p v_p \end{pmatrix} + p_2 \begin{pmatrix} 2u_p v_p \\ \rho_p^2 + 2v_p^2 \end{pmatrix} \right](1 + p_3 \rho_p^2 + \ldots)$$

Here, $\rho_p^2 = u_p^2 + v_p^2$

In Brown's model, distortion is represented by rotationally symmetrical radial distortion parameters ($k_1$, $k_2$, $k_3$, ...) and rotationally asymmetrical tangent distortion parameters ($p_1$, $p_2$, $p_3$, ...).

In camera calibration, in general, an image of a calibration chart, in which world coordinates $(x, y, z)$ include a plurality of known feature points, is acquired with a camera. Subsequently, the pixel coordinates $(u, v)$ at which images of the feature points are acquired are acquired by means of image processing. In this way, the camera parameters are determined by obtaining a plurality of measurement data representing the correspondence between the world coordinates $(x, y, z)$ and the pixel coordinates $(u, v)$.

CITATION LIST

Patent Literature

{PTL 1} Publication of Japanese Patent No. 3735344

Non Patent Literature

{NPL 1} Digital Image Processing [revised new edition], (CG-ARTS Association 2015), pp. 308-317
{NPL 2} D. C. Brown, "Close-range camera calibration", PhotoGramm. Eng. 37, 855-866 (1971)

SUMMARY OF INVENTION

An aspect of the present invention is a calibration apparatus for an optical apparatus provided with a two-dimensional image-conversion device having a plurality of pixels and an optical system that forms an imaging relationship between the image-conversion device and a three-dimensional world coordinate space, wherein the calibration apparatus is configured to: acquire calibration data indicating a correspondence between two-dimensional pixel coordinates of the image-conversion device and three-dimensional world coordinates of the world coordinate space; and calculate parameters of a camera model in which two coordinate values of the two-dimensional pixel coordinates are expressed as a function of three coordinate values of the three-dimensional world coordinates by fitting the camera model to the acquired calibration data, wherein, when a projection relationship between an angle of view $\theta$ and an image height y of the optical system is roughly expressed by a projection expression $y=fP(\theta)$ by using a projection focal distance f, the calibration apparatus is configured to convert three-dimensional world coordinates (x, y, z) of the acquired calibration data to two-dimensional coordinates $(P(\theta)\cos \varphi, P(\theta)\sin \varphi)$ by using three-dimensional spherical coordinates $(r, \theta, \varphi)$ that are equal to the world coordinates, and, subsequently, by fitting a camera model in which the two coordinate values of the two-dimensional pixel coordinates are expressed as a function of two coordinate values of the two-dimensional coordinates $(P(\theta)\cos \varphi, P(\theta)\sin \varphi)$, calculate the parameters of the camera model.

Another aspect of the present invention is a calibration method including: acquiring calibration data that represent, for an optical apparatus provided with a two-dimensional image-conversion device having a plurality of pixels and an optical system that converts an imaging relationship between the image-conversion device and the three-dimensional world coordinate space, a correspondence between two-dimensional pixel coordinates and three-dimensional world coordinates of the world coordinate space of the image-conversion device; and calculating parameters of a camera model in which two coordinate values of the two-dimensional pixel coordinates are expressed as a function of three coordinate values of the three-dimensional world coordinates by fitting the camera model to the acquired calibration data, wherein, when a projection relationship between an angle of view $\theta$ and an image height y of the optical system is roughly expressed by a projection expression $y=fP(\theta)$ by using a projection focal distance f, in the calculating the parameters, three-dimensional world coordinates (x, y, z) of the calibration data acquired in the acquiring the calibration data are converted to two-dimensional coordinates $(P(\theta)\cos \varphi, P(\theta)\sin \varphi)$ by using three-dimensional spherical coordinates $(r, \theta, \varphi)$ that are equal to the world coordinates, and, subsequently, by fitting a camera model in which two coordinate values of the two-dimensional pixel coordinates are expressed as a function of two coordinate values of the two-dimensional coordinates $(P(\theta) \cos \varphi, P(\theta)\sin \varphi)$, the parameters of the camera model are calculated.

BRIEF DESCRIPTION OF DRAWINGS

FIG. 3 is a diagram showing a flowchart for explaining a calibration method performed by means of the calibration apparatus in FIG. 1.

FIG. 5 is a diagram showing a flowchart for performing distortion correction.

DESCRIPTION OF EMBODIMENTS

A calibration apparatus and a camera calibration method according to a first embodiment of the present invention will be described below with reference to the drawings.

The calibration apparatus according to this embodiment is a camera calibration apparatus 1 in which the calibration target is a camera (image capturing apparatus, optical apparatus) 2 that externally transfers an acquired image after converting the image to an image file of a predetermined format. In this embodiment, the camera 2 is used as an example of an optical apparatus.

Figure 1:
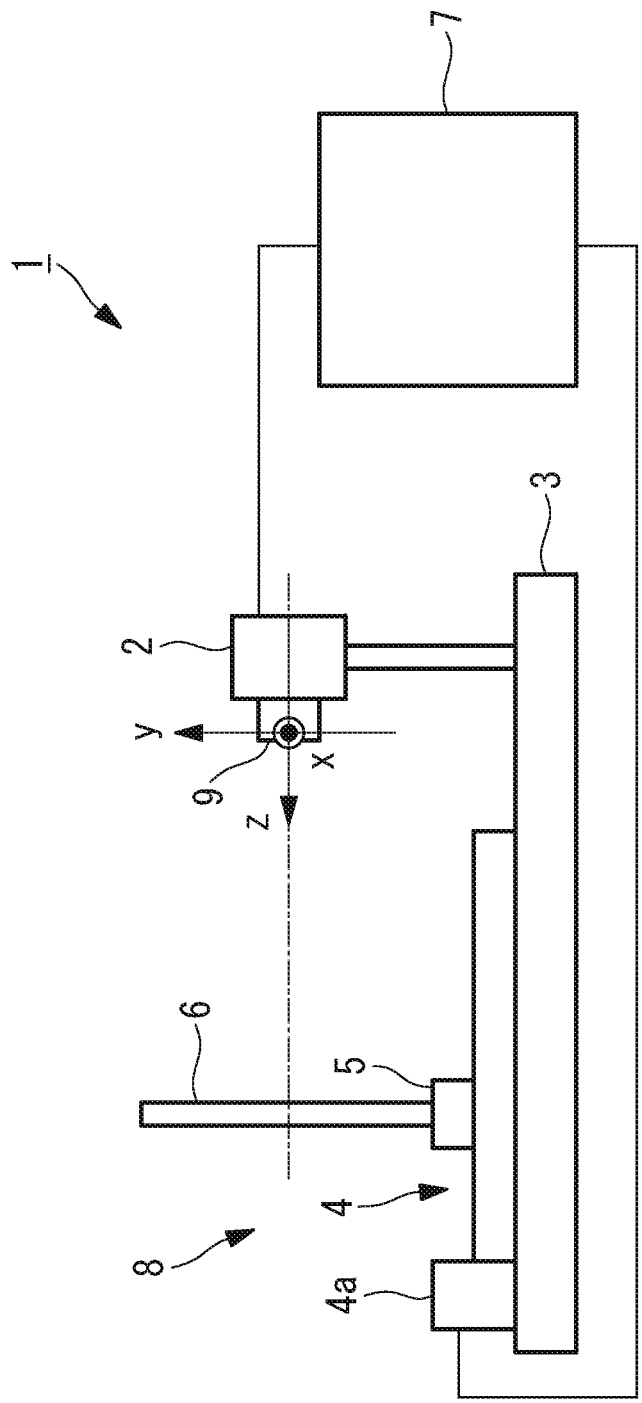
FIG. 1 is an overall configuration diagram schematically showing a calibration apparatus according to a first embodiment of the present invention.

As shown in FIG. 1, the camera calibration apparatus 1 according to this embodiment is provided with: a base 3 that secures the camera 2, which is the calibration target; a z-axis-movement stage 4 that is provided in the base 3; a calibration chart 6 secured to a movable portion 5 that is moved by the z-axis-movement stage 4; and a computer (parameter calculating portion) 7 that is connected to the camera 2 and the z-axis-movement stage 4. Three-dimensional coordinate axes of the camera calibration apparatus 1 are defined as shown in FIG. 1. A calibration-data acquiring portion 8 is provided with: the base 3 that secures the camera 2, the calibration chart 6, and the z-axis-movement stage 4. The calibration-data acquiring portion 8 acquires calibration data that indicate correspondence between two-dimensional pixel coordinates (u, v) of an image-acquisition device 18 and three-dimensional world coordinates (x, y, z) of a world coordinate space, described later.

The z-axis-movement stage 4 is a linear driving mechanism that linearly moves the movable portion 5 by being driven by a motor 4a. In the camera calibration apparatus 1, the moving direction of the movable portion 5 is defined as the z-axis, and the horizontal direction and the vertical direction in a plane that is perpendicular to the z-axis are defined as the x-axis and the y-axis, respectively.

In this embodiment, the position of the coordinate origin is defined as being in the vicinity of an entrance pupil of a camera lens 9.

The camera 2 is installed so that the optical axis thereof is parallel to the z-axis, is installed so that the horizontal direction and vertical direction of an image-acquisition surface are parallel to the x-axis and the y-axis, respectively, and is attached to the base 3 for the purpose of aligning the coordinate origin with a predetermined position in the camera 2.

Figure 2:
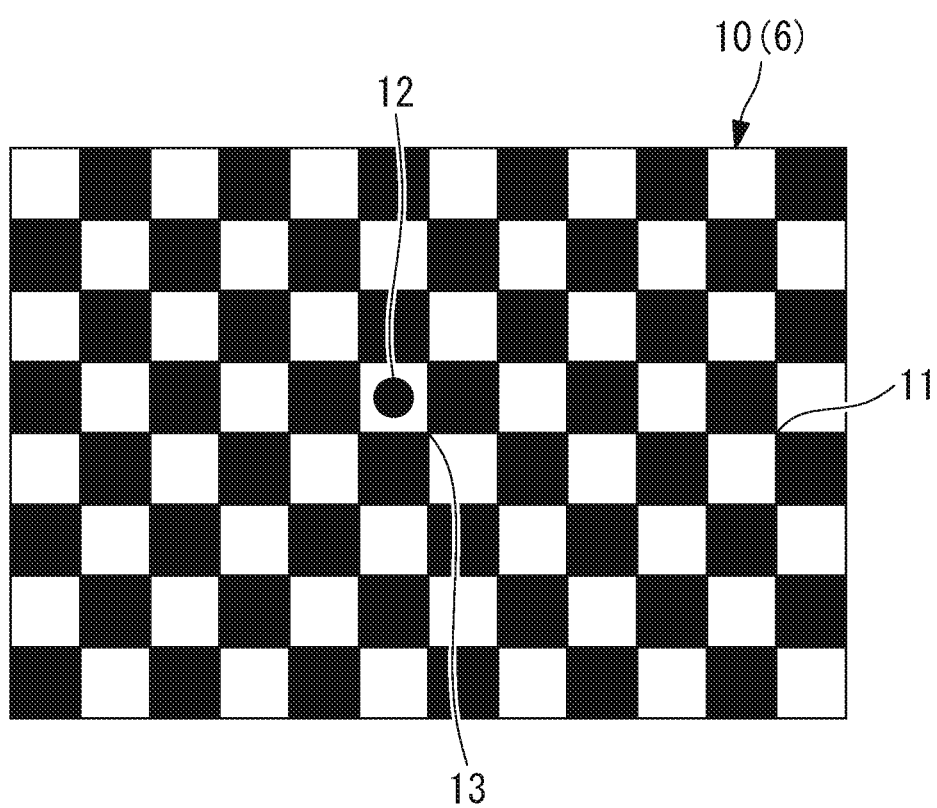
FIG. 2 is a diagram showing a pattern of a calibration chart of the calibration apparatus in FIG. 1.

The calibration chart 6 is a chess board 10 in FIG. 2, which is widely utilized in camera calibration, and is installed so as to directly face the camera 2 secured to the base 3; in other words, the chess board 10 is secured to the movable portion 5 in a state in which the chess board 10 is disposed in a plane that is perpendicular to the z-axis. There is no limitation to the type of the calibration chart 6 so long as the calibration chart 6 is a chart that is provided with a plurality of feature points.

The calibration chart 6 can be moved to an arbitrary position in the z-axis direction by means of the z-axis-movement stage 4. The movement range of the movable portion 5 of the z-axis-movement stage 4 encompasses a range of object distances required to perform the camera calibration (i.e., the distance between the camera 2 and an image-acquisition target).

The computer 7 functions, as a result of controlling the image acquisition of the camera 2, in a manner in which an acquired image is loaded in the form of an image file of a predetermined format. The computer 7 functions, as a result of controlling the z-axis-movement stage 4, in a manner in which the calibration chart 6 is moved to a predetermined position in the z-axis direction. The computer 7 also functions as a parameter calculating portion that calculates camera parameters by fitting a camera model to acquired calibration data.

Here, the chess board 10 that is used as the calibration chart 6 will be described with reference to FIG. 2.

The chess board 10 is a flat-plate-like member that has a checkered pattern in a manner in which black and white squares are arranged on a flat surface so as to form a square grid, and intersections corresponding to apexes of the individual squares are utilized as feature points for the camera calibration (hereinafter these feature points will be referred to as grid points 11).

As the chess board 10, a chess board in which a sufficient number of the grid points 11 for the camera calibration fall within an image-acquisition area of the camera 2 is used. Although the area of the chess board 10 that is acquired in an image changes depending on the object distance, it is preferable that at least about 10×10 grid points 11 be acquired in an image at each object distance. In addition, one reference position mark 12 is provided in the vicinity of the center of the calibration chart 6 in order to establish correspondence between pixel coordinates of the grid points 11 in the acquired image and world coordinates of the grid points 11 on the calibration chart 6.

In a manner in which a grid point (center grid point 13) in the closest vicinity of the reference position mark 12 on the lower right side is positioned on the z-axis and, at the same time, the vertical side and the horizontal side of the chess board 10 are parallel to the x-axis and the y-axis, the chess board 10 is installed in the camera calibration apparatus 1. By doing so, from the grid intervals of the square grids of the chess board 10 and the moved positions of the z-axis-movement stage 4, the world coordinates (x, y, z) of the individual grid points 11 and 13 are determined as known values.

The camera calibration method employing the camera calibration apparatus 1 according to this embodiment, thus configured, will be described below.

In order to calibrate the camera 2 by using the camera calibration apparatus 1 according to this embodiment, first, an operator attaches the camera 2, which is the calibration target, to the camera calibration apparatus 1 in accordance with the definitions of the coordinate axes and connects the camera 2 to the computer 7. Subsequently, a measurement program in the computer 7 is started.

Subsequently, by means of the measurement program, images of the calibration chart 6 at a plurality of object distances are automatically acquired by the camera 2, and the pixel coordinates of the grid points 11 are acquired from the acquired images. The measurement program will be described with reference to the flowchart in FIG. 3.

Once measurement is started, first, the z-axis-movement stage 4 is moved for the purpose of positioning the calibration chart 6 on a side closer to the camera 2 in the range of object distances at which the camera 2 is calibrated (step S1). Next, the camera 2 acquires an image of the calibration chart 6, and the acquired image file is transferred to the computer 7 (step S2). Then, the image acquisition is performed in a predetermined number of times, and, the steps S1 and S2 are repeated until a predetermined number of images are acquired (step S3). The predetermined number of times is set to, for example, five times or more.

At this time, each time step S1 is repeated, the movable portion 5 is moved by the z-axis-movement stage 4 for the purpose of increasing the object distance from the camera 2 to the calibration chart 6 by a predetermined interval. Although the amounts by which the movable portion 5 is moved need not be at equal intervals, it is preferable that the images of the calibration chart 6 be acquired at about five different object distances in the range of the object distances at which the camera 2 is calibrated. Then, the procedure advances to step S4 when the predetermined number of images are acquired.

As a result of applying image processing to the plurality of image files that have been transferred to the computer 7 in steps S1 to S3, the pixel coordinates of the individual grid points 11 in the image-acquisition area are calculated, and the pixel coordinates of the center of gravity of the reference position mark 12 in the individual image files are calculated (step S4). Note that, because a method of determining the pixel coordinates of the grid points 11 of the chess board 10 by means of sub-pixels is publicly known, the description thereof will be omitted.

Next, the pixel coordinates of the individual grid points 11 determined in step S4 are associated with the world coordinates of the grid points 11 on the calibration chart 6 (step S5). Because the center grid point 13 in the closest vicinity of the reference position mark 12 on the lower right side is on the z-axis of the world coordinates, as described above, it is possible to associate the pixel coordinates and world coordinates of the individual grid points 11 and 13 with reference to the center grid point 13 in the closest vicinity of the reference position mark 12 on the lower right side. Finally, all of the pixel coordinates and the world coordinates that have been associated with each other are exported into a measurement data file, thus ending the measurement. The measurement data required to optimize the camera parameters are obtained by means of the above-described procedures.

The camera model employed in this embodiment will be described with reference to FIGS. 4A and 4B.

Figure 4A:
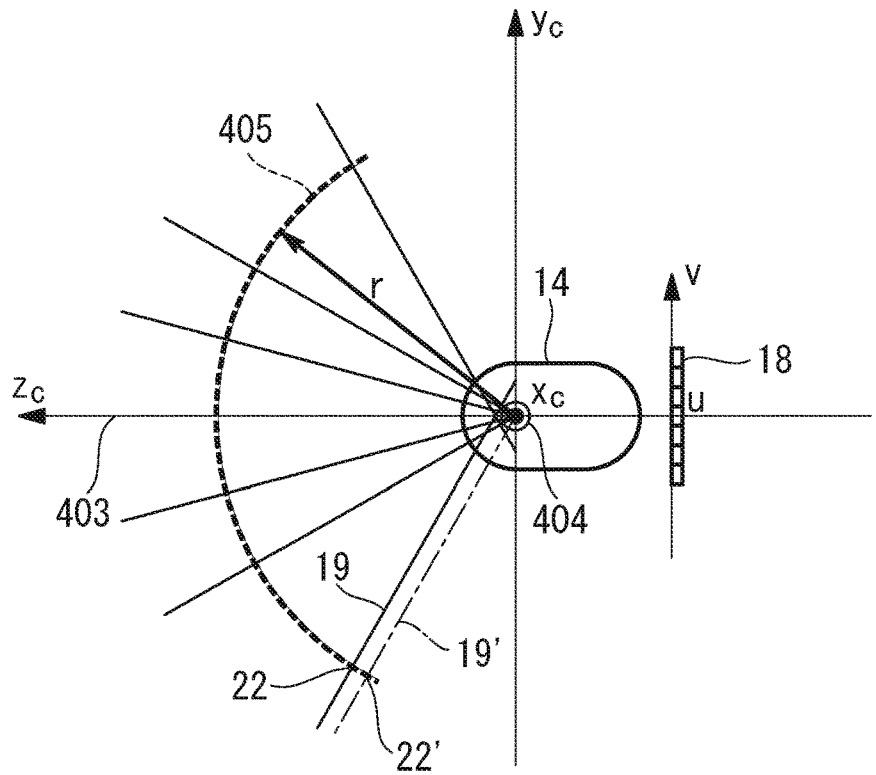
FIG. 4A is a diagram for explaining a camera model employed in the calibration apparatus in FIG. 1, and is a diagram showing a cross-section of a camera for explaining object-side principal rays corresponding to pixel coordinates of the camera.
Figure 4B:
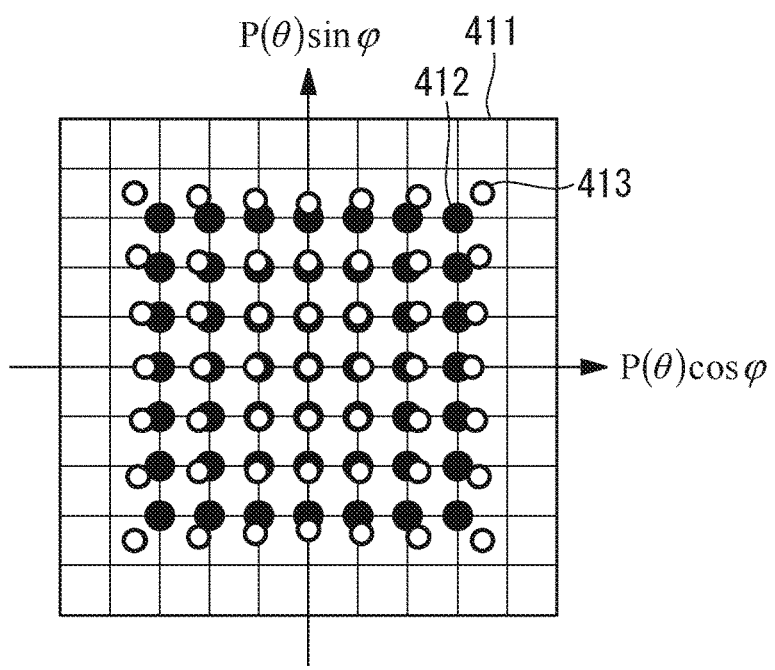
FIG. 4B is a diagram for explaining the camera model employed in the calibration apparatus in FIG. 1, and is a diagram showing directions of the principal rays corresponding to the individual pixels.

FIG. 4A is a cross-sectional view of the camera 2 for explaining object-side principal rays 19 corresponding to the pixel coordinates of the camera 2. The camera 2 is provided with an image-acquisition optical system (optical system) 14 and an image-acquisition device (image-conversion device) 18.

Camera coordinates ($x_c$, $y_c$, $z_c$) are defined as shown in FIG. 4A. The origin of the camera coordinates is a center 404 of the entrance pupil of the image-acquisition optical system 14 and the $z_c$-axis is aligned with an optical axis 403. In the image-acquisition surface of the image-acquisition device 18, the u-axis and v-axis of the pixel coordinates are defined so as to be parallel to the lateral direction and vertical direction of the image-acquisition device 18. The u-axis and v-axis of the pixel coordinates and the $x_c$-axis and $y_c$-axis of the camera coordinates are respectively parallel to each other. In this embodiment, the world coordinates nearly coincide with the camera coordinates. FIG. 4A shows the object-side principal rays 19 that are made incident on centers of the individual pixels of the image-acquisition device 18 through the image-acquisition optical system 14.

The principal rays 19 are rays that pass through a center of an aperture stop (not shown) of the image-acquisition optical system 14. Accordingly, blurred images on the image-acquisition device 18 that correspond to the object points 22 in the principal rays 19 spread out centered on an intersection (not shown) of the principal rays 19 and the image-acquisition device 18; therefore, if the centers of gravity of the light intensities of the blurred image points are assumed to be the image positions, the positions of the image points do not change. Therefore, all of the object points 22 in the object-side principal rays 19 form an image at a single image point. In other words, object-side principal rays 19 are back-projection lines of the image point.

The relationship between the directions of the principal rays 19 and image positions corresponding thereto is represented by a projection expression. For example, in the case in which the image-acquisition optical system 14 is designed based on a center projection, a relationship y=f tan θ holds between angles of view θ of the object-side principal rays 19 and heights y of the image points corresponding thereto. Here, f is the projection focal distance. Other typical projection expressions include an equidistance projection y=fθ, an equisolid angle projection y=2f sin(θ/2), a stereographic projection y=2f tan(θ/2), and an orthographic projection y=f sin θ.

These projection expressions are selected in accordance with the intended use of the camera 2. For example, in the equisolid angle projection, a solid angle on the object side, in other words, an apparent size, is saved as an image area. Therefore, this expression is suitable for a usage such as measuring the proportion of cloud cover of the entire sky. Other projection expressions have respective features.

Meanwhile, the image-acquisition optical system 14 for general photography is not necessarily dependent on the above-described specific projection expressions. An arbitrary projection expression, including the above-described specific projection expressions, is expressed as y=fP(θ). P(θ) is a function of the angle of view θ, for example, the expression takes the form P(θ)=θ in the case of the equi-distance projection, and P(θ)=2 sin(θ/2) in the case of the equisolid angle projection. In general, it is possible to specify the arbitrary projection expression by using coefficients $c_3$, $c_5$ ... of a polynomial in Eq. 6.

$$P(\theta) = \theta + c_3 \theta^3 + c_5 \theta^5 + \ldots \quad \{\text{Eq. 6}\}$$

Next, pupil aberration will be described. An entrance pupil is a virtual opening that is an image of an aperture stop formed by an optical system that is closer to an object side than the aperture stop is. As shown in FIG. 4A, although the object-side principal-ray group passes through the vicinity of the center 404 of the entrance pupil, unlike the case of the aperture stop, the principal rays do not intersect at a single point at the center 404 of the entrance pupil.

This is because an aberration of the optical system is involved in the imaging relationship between the aperture stop and the entrance pupil. This is the pupil aberration. Therefore, in order to define the pixel coordinates with respect to the camera coordinates, it is necessary to appropriately model the directions of the principal rays 19 and the movements of the principal rays 19 due to the pupil aberration.

The camera model of the present invention, which is created for the purpose of adapting to such a situation, will be described. First, the relationship between the pixel coordinates and the directions of the principal rays 19 will be described in terms of FIG. 4B. Note that, in the following, although the image-acquisition device 18 in which the individual pixels are arrayed in a square-grid-like manner will be described as an example, this embodiment is not limited thereto.

Camera coordinates (r, θ, φ) represented by spherical coordinates will be newly introduced. This polar angle θ is an angle formed between a principal ray 19 and the optical axis 403; in other words, the polar angle θ is equal to the angle of view. An azimuth φ is an angle that represents a direction about the optical axis 403. The relationship between the camera coordinates ($x_c$, $y_c$, $z_c$), which are orthogonal coordinates, and the coordinates (r, θ, φ) is represented by Eq. 7.

$$\begin{pmatrix} x_c \\ y_c \\ z_c \end{pmatrix} = \begin{pmatrix} r\sin\theta\cos\varphi \\ r\sin\theta\sin\varphi \\ r\cos\theta \end{pmatrix} \quad \{\text{Eq. 7}\}$$

In the case in which the image-acquisition optical system 14 is designed according to the projection expression y=fP(θ), plotting the directions of the principal rays 19 corresponding to the individual pixels in the image-acquisition device 18 on a P(θ)cos φ–P(θ)sin φ plane 411, the directions of the principal rays 19 are arrayed in a square grid 412, which is similar to the pixel array. However, because there are manufacturing errors in an actual image-acquisition optical system 14, the directions of the principal rays 19 are displaced in directions 413 differing from the square grid 412.

In the present invention, the displacement to the actual directions 413 from the square grid 412 as per design is considered to be a phenomenon that is similar to the distortion of the image position due to a distortion. In other words, it is assumed that a distortion model represents directions (P(θ)cos φ, P(θ)sin φ) of the principal rays 19 corresponding to the pixel coordinates (u, v) of the image-acquisition device 18. This model should hold even if the directions (P(θ)cos φ, P(θ)sin φ) and the pixel coordinates (u, v) are switched. Therefore, in this embodiment, based on Brown's model in Eq. 5, the pixel coordinates (u, v) corresponding to the directions (P(θ)cos φ, P(θ)sin φ) of the principal rays 19 are modeled by Eq. 8.

$$\begin{pmatrix} u \\ v \end{pmatrix} = k_0 \begin{pmatrix} \xi' \\ \eta' \end{pmatrix} + k_1 \rho'^2 \begin{pmatrix} \xi' \\ \eta' \end{pmatrix} + p_1 \begin{pmatrix} \rho'^2 + 2\xi'^2 \\ 2\xi'\eta' \end{pmatrix} + p_2 \begin{pmatrix} 2\xi'\eta' \\ \rho'^2 + 2\eta'^2 \end{pmatrix} \quad \{\text{Eq. 8}\}$$

Here, $\begin{pmatrix} \xi' \\ \eta' \end{pmatrix} = P(\theta) \begin{pmatrix} \cos\varphi \\ \sin\varphi \end{pmatrix}, \rho'^2 = \xi'^2 + \eta'^2$ Changes made from Brown's model in Eq. 5 to the pixel coordinate model in Eq. 8 are as follow:
(1) The term of a coefficient $k_0$, which corresponds to lateral magnification, is added.
(2) Only a third-order radial distortion $k_1$ and a second-order tangent distortion ($p_1$, $p_2$) are taken into consideration.

Next, in terms of FIG. 4A, virtual principal rays 19' that are parallel to the principal rays 19 and that pass through the center 404 of the entrance pupil will be considered. At the limit where the object distance r is infinite, the object points 22 in the principal rays 19 and object points 22' in the virtual principal rays 19' form an image on the same image point. This is because a spherical surface 405 of an object-side image-acquisition area, which corresponds to an effective image-acquisition area on the image-acquisition device 18 also infinitely spreads out, and because, as compared to this spread, the distances between the principal rays 19 and the virtual principal rays 19' are negligible.

When the object distance r is finite, the positions of the image points that respectively correspond to the object points 22 in the principal rays 19 and the object points 22' in the virtual principal rays 19' are not in alignment. This divergence is approximately inversely proportional to the object distance r in the pixel coordinates. This is because the distances between the principal rays 19 and the virtual principal rays 19' (which are equal to the distances between the object points 22 and the object points 22') are constant regardless of the object distance, and, because, on the other hand, the length of the object-side effective image-acquisition area on the spherical surface 405 increases as a result of being approximately proportional to the object distance r.

On the basis of the above discussion, the camera model of this embodiment in Eq. 9 is obtained by replacing the individual coefficients in Eq. 8 with a polynomial in the inverse of the object distance r.

$$\begin{pmatrix} u \\ v \end{pmatrix} = k'_0 \begin{pmatrix} \xi' \\ \eta' \end{pmatrix} + k'_1 \rho'^2 \begin{pmatrix} \xi' \\ \eta' \end{pmatrix} + p'_1 \begin{pmatrix} \rho'^2 + 2\xi'^2 \\ 2\xi'\eta' \end{pmatrix} + p'_2 \begin{pmatrix} 2\xi'\eta' \\ \rho'^2 + 2\eta'^2 \end{pmatrix} \quad \{\text{Eq. 9}\}$$

Here, $k'_0 = k_{0,0} + k_{0,1}\frac{1}{r} + k_{0,2}\frac{1}{r^2} + \ldots,$ $k'_1 = k_{1,0} + k_{1,1}\frac{1}{r} + k_{1,2}\frac{1}{r^2} + \ldots,$ $p'_1 = p_{1,0} + p_{1,1}\frac{1}{r} + p_{1,2}\frac{1}{r^2} + \ldots,$ $p'_2 = p_{2,0} + p_{2,1}\frac{1}{r} + p_{2,2}\frac{1}{r^2} + \ldots.$ Constant terms $k_{00}$, $k_{10}$, $p_{10}$, and $p_{20}$ of the polynomial in the inverse of the object distance r indicate that, at the limit where the object distance r is infinite, the object points 22 in the principal rays 19 and the object points 22' in the virtual principal rays 19' form images on the same image point. Coefficients $k_{01}$, $k_{11}$, $p_{11}$, and $p_{21}$ of the inverse of the object distance r indicate that the divergence between the image points of the principal rays 19 and the virtual principal rays 19' is inversely proportional to the object distance r.

In order to enhance the model precision, it is possible to use a term that is equal to or greater than the second power of the inverse of the object distance r. In contrast, when the pupil aberration is negligible, it is possible to employ the camera model in Eq. 9 in which only the constant terms $k_{00}$, $k_{10}$, $p_{10}$, $p_{20}$ are kept (which is equal to Eq. 8).

As has been described above, the camera model, which is indicated by Eq. 9 and employed in the camera calibration apparatus 1 according to this embodiment, directly models the pixel coordinates corresponding to the world coordinates. The world coordinates are included in the camera model in the forms of the projection expression in Eq. 6 and the coordinates (P(θ)cos φ, P(θ)sin φ) that have been converted by the spherical coordinates in Eq. 7.

This camera model is constructed on the basis of the linear model in Eq. 5 which represents the imaging relationship between the two conjugate planes. This camera model is characterized in that the individual coefficients of the linear model are replaced by the polynomial expression of the inverse of the distance r.

The camera model in Eq. 9 employed in the camera calibration apparatus 1 of this embodiment is also characterized in that the pixel coordinate vectors (u, v) are represented by a linear combination of linearly independent two-dimensional basis function vectors (two-dimensional vector functions) consisting of variables P(θ)cos φ, P(θ)sin φ, and r. Because the pixel coordinate vectors (u, v) are the linear combination of the basis function vectors, coefficients of the model that represent the u coordinates and the v coordinates are the same. Because of this, it is possible to determine the coefficients of the respective basis function vectors from all measurement data by means of the linear least-squares method.

Next, procedures for calibrating the camera 2 by using the camera calibration apparatus 1 of this embodiment will be described. With the above-described measurement program shown in FIG. 3, the measurement data indicating the correspondence between the world coordinates (x, y, z) and the pixel coordinates (u, v) are determined. Next, by means of Eq. 7 and Eq. 8, the world coordinates (x, y, z) are converted to (ξ', η', r).

The camera model shown in Eq. 9 including the independent variables (ξ', η', r) and the dependent variables (u, v) is fitted to the measurement data of all of the grid points 11 and 13 by means of the linear least-squares method, and thus, the individual coefficients of the camera model in Eq. 9 (camera parameters) are determined. The camera calibration of this embodiment is thus ended.

It is possible to use the camera model, in which the camera parameters determined in this embodiment are set, as described below, in an image capturing apparatus including the camera 2 in which the camera model is installed. The image capturing apparatus is provided with: a pixel-coordinate calculating portion (not shown) that calculates the two-dimensional pixel coordinates from the three-dimensional world coordinates; and a distortion-corrected-image generating portion (not shown) that generates an image in which distortion is corrected.

First, when determining the pixel coordinates (u, v) corresponding to the world coordinates (x, y, z), it is possible to determine the target pixel coordinates (u, v) by converting, in the pixel-coordinate calculating portion, the world coordinates (x, y, z) to (ξ', η', r) by means of Eq. 7 and Eq. 8, and by subsequently applying the converted (ξ', η', r) to the camera model indicated in Eq. 9.

Second, it is possible to correct the distortion of the image acquired by the calibrated camera 2 by means of the distortion-corrected-image generating portion. A method therefor will be described below.

An object represented by the world coordinates forms a distorted image as a result of image acquisition by the camera 2. In contrast, by back projecting the obtained image onto the world coordinates, it is possible to correct the distortion. When an image of an object located on a plane at a known object distance z is acquired, the pixel coordinates (u, v) may be back projected onto the world coordinates (x, y) on the plane at the object distance z.

With an image in which an object that is not on the plane at the object distance z is acquired, by defining a reference object distance for the distortion correction, the back projection to the world coordinates (x, y) at the object distance z is performed. If changes in the distortion due to the object distance are small, the distortion correction performed in this way is sufficient. When back projected to the world coordinates, an image ends up being enlarged or reduced.

The back-projected world coordinates are normalized by using the inverse of the lateral magnification $k_0'$ of the camera model in Eq. 9, in other words, the lateral magnification to the world coordinates from the pixel coordinates. By doing so, it is possible to obtain a distortion-corrected image that is nearly the same size as the original image.

The creation of the distortion-corrected image involves a series of procedures in which pixel values of the original image corresponding to the pixel coordinates (integers) of the distortion-corrected image are substituted for the pixel values of the distortion-corrected pixel coordinates. These procedures will be described with reference to the flowchart in FIG. 5. Once the distortion correction is started, first distortion-corrected pixel coordinates ($u_c$, $v_c$) are determined (step S11).

Next, the world coordinates (x, y) are determined by multiplying the first distortion-corrected pixel coordinates ($u_c$, $v_c$) by the inverse of the lateral magnification $k_0'$ of the camera model in Eq. 9 at the reference object distance z (step S12). The world coordinates (x, y, z) are converted to (ξ', η', r) by means of Eq. 7 and Eq. 8, and the converted (ξ', η', r) are subsequently applied to the camera model in Eq. 9, and thus, the pixel coordinates (u, v) before the distortion correction are determined (step S13).

The pixel coordinates (u, v) before the distortion correction are generally non-integers. The pixel values of the pixel coordinates (u, v) are determined, by means of bilinear interpolation, from the pixel values of four pixels that are in the vicinity of the pixel coordinates. The determined pixel values are used as the pixel values of the distortion-corrected pixel coordinates ($u_c$, $v_c$) (step S14).

Note that another method such as bicubic interpolation may be employed to interpolate the pixel values. With respect to all of the distortion-corrected pixel coordinates ($u_c$, $v_c$), the above-described steps S11 to S14 are repeated a predetermined number of times (step S15), and the distortion correction is ended after the procedures are repeated the predetermined number of times.

With the above-described distortion correction, although an example in which a flat surface at the object distance z is used as the reference is described as an example, it is possible to change the method to a method in which the distortion correction is executed by using a surface in the world coordinate space other than the above-described surface or a curved surface in the world coordinate space as the reference. For example, with an image acquired by using the camera 2 that is designed for equidistance projection, there are cases in which an accurate equidistance projection image is not necessarily formed due to manufacturing errors or the like of the camera 2. In this case, on the basis of the projection expression y=fθ of the equidistance projection, by defining the correspondence between the pixel coordinates and the world coordinates on a spherical surface having a reference radius and by executing, on the basis of this definition, the distortion correction by using procedures that are similar to those described above, it is possible to perform the distortion correction by means of a method in which an intended equidistance projection image is obtained. This is also applicable to other projection methods.

In the utilization examples of the first and second camera models, described above, the pixel coordinates corresponding to the world coordinates are calculated by means of the camera model in Eq. 9 each time. On the other hand, by calculating the pixel coordinates corresponding to the world coordinates in advance and by retaining the calculation results in the form of a data array, it is possible to achieve high-speed calculation.

In this embodiment, the camera calibration is executed by using the measurement data of the grid points 11 and 13 that are arrayed on the chess board 10, which is a flat surface, in a square-grid-like manner. The feature points on the calibration chart 6 may be in a pattern other than the grid points 11 and 13.

For example, a method for creating the measurement data in which an image of dot marks distributed on a flat surface is acquired and the center of gravity positions thereof are used as the pixel coordinates may be employed. The feature points used in the camera calibration of the present invention need not be regularly arrayed in the world coordinate space. Even if the feature points are randomly arranged, so long as it is possible to know the correspondence between the world coordinates and the pixel coordinates by means of measurement, simulation, or the like, it is possible to fit the camera model of the present invention to the world coordinates and the pixel coordinates.

As has been described above, the only condition required for the measurement data of the camera calibration of this embodiment is that the correspondence between the world coordinates and the pixel coordinates is known. It is also possible to acquire such measurement data by means of, for example, the following method. First, a point light source that can be moved in x-, y-, and z-axis directions is provided on the world-coordinate side. In a manner in which an image of the provided point light source is positioned at a pixel coordinate to be focused in an image of the point light source acquired by the camera 2, the point light source is moved in the x, y, z-axis directions. It is also possible to determine the correspondence between the world coordinates and the pixel coordinates by repeating such a measurement.

Alternatively, in the case in which it is not possible to encompass the entire angle of view with a single calibration chart 6 because the camera 2 has a large angle of view, the entire angle of view of the camera 2 may be encompassed by installing calibration charts 6 at a plurality of angles of view. In this case also, so long as the correspondence between the world coordinates and pixel coordinates of the feature points on the calibration charts 6 is known, it is possible to apply the camera calibration method of this embodiment.

In this embodiment, the camera model in which only the third-order radial distortion and the second-order tangent distortion are taken into consideration is employed. When calibrating a camera 2 that has even greater distortion, it is possible to employ a camera model in which a term for a higher-order distortion or a rotationally asymmetrical distortion is added.

It is also possible to omit an unnecessary term from the camera model. For example, when calibrating a camera 2 in which a rotationally asymmetrical distortion component is always negligibly small, it is better to omit the tangential-distortion term of the camera model. By doing so, it is possible to prevent the camera model from becoming inaccurate by being meaninglessly modified due to measurement errors of the grid points 11. This is also applicable to other terms.

As has been described above, with the camera calibration apparatus 1 and the camera calibration method according to this embodiment, it is possible to accurately model the pupil aberration of the image-acquisition optical system 14 by means of the camera model of this embodiment.

It is also possible to model the rotationally asymmetrical distortion and the pupil aberration. By doing so, it is possible to accurately express the pixel coordinates corresponding to the world coordinates, and thus, it is possible to enhance the precision of the camera model.

Because the camera calibration apparatus 1 and the camera calibration method of this embodiment use the camera model based on the projection expression of the camera 2, which is the calibration target, it is possible to suppress the maximum order required for the model. At the same time, unlike an example in the related art, it is also possible to calibrate a camera 2 in which the half angle of view is equal to or greater than 90°.

Because the camera calibration apparatus 1 and the camera calibration method of this embodiment use the linear camera model, it is possible to fit the camera model to the measurement data by means of the linear least-squares method. Therefore, unlike an example in the related art, there is no failure when performing optimization, and it is possible to considerably reduce the calculation time.

The feature points used in the camera calibration apparatus 1 and the camera calibration method of this embodiment need not be regularly arrayed. Therefore, so long as the correspondence between the world coordinates and the pixel coordinates can be made clear, it is possible to select an acquisition method based on an arbitrary measurement or calculation that is suitable for a camera 2 to be calibrated.

Next, a camera calibration method according to a second embodiment of the present invention will be described below.

The camera calibration method according to this embodiment employs, as the camera calibration apparatus 1, an apparatus provided with: a world-coordinates rotating portion (not shown) that converts the world coordinates to rotated world coordinates on the basis of a rotation angle; and a world-coordinates translating portion (not shown) that converts the world coordinates to translated world coordinates by using translation components.

The first embodiment describes the camera calibration method in the case in which, as shown in FIG. 1, the entrance pupil of the camera 2 to be calibrated is nearly in alignment with the origin of the world coordinates, the optical axis is parallel to the z-axis of the camera calibration apparatus 1, and the horizontal direction and vertical direction of the image-acquisition surface are parallel to the x-axis and the y-axis. In this embodiment, a camera calibration method will be described for the case in which the conditions are not met, in other words, in the case in which the world coordinates do not coincide with the camera coordinates.

The camera model used in the first embodiment is established by using the camera coordinates in which the origin thereof is at the center 404 of the entrance pupil of the image-acquisition optical system 14 of the camera 2, which is the calibration target. Therefore, when the world coordinates of the grid points 11 on the calibration chart 6 in the camera calibration apparatus 1 in FIG. 1 are converted to the camera coordinates, the above-described camera model can be fitted thereto. The conversion to the camera coordinates $(x_c, y_c, z_c)$ from the world coordinates $(x, y, z)$ is represented by Eq. 10 on the basis of the three-axis rotation matrix R and the translation vector T in Eq. 2.

$$\begin{pmatrix} x_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x \\ y \\ z \end{pmatrix} + \begin{pmatrix} t_x \\ t_y \\ t_z \end{pmatrix} \qquad \{Eq.\ 10\}$$

Therefore, in the second embodiment, among the measured measurement data representing correspondence between the world coordinates $(x, y, z)$ and the pixel coordinates $(u, v)$ of the plurality of grid points 11, only the world coordinates are converted to camera coordinates $(x_c, y_c, z_c)$ by means of Eq. 10, and the camera model of the first embodiment is subsequently fitted thereto.

Then, for the purpose of minimizing the residuals, three-axis rotation angles $\theta_x$, $\theta_y$, and $\theta_z$ in the rotation matrix R and three components $(t_x, t_y, \text{and } t_z)$ of the translation vector T are optimized. In general, when the world coordinates converted by means of Eq. 10 coincide with the camera coordinates, the residuals of the camera model are minimized.

Figure 6:
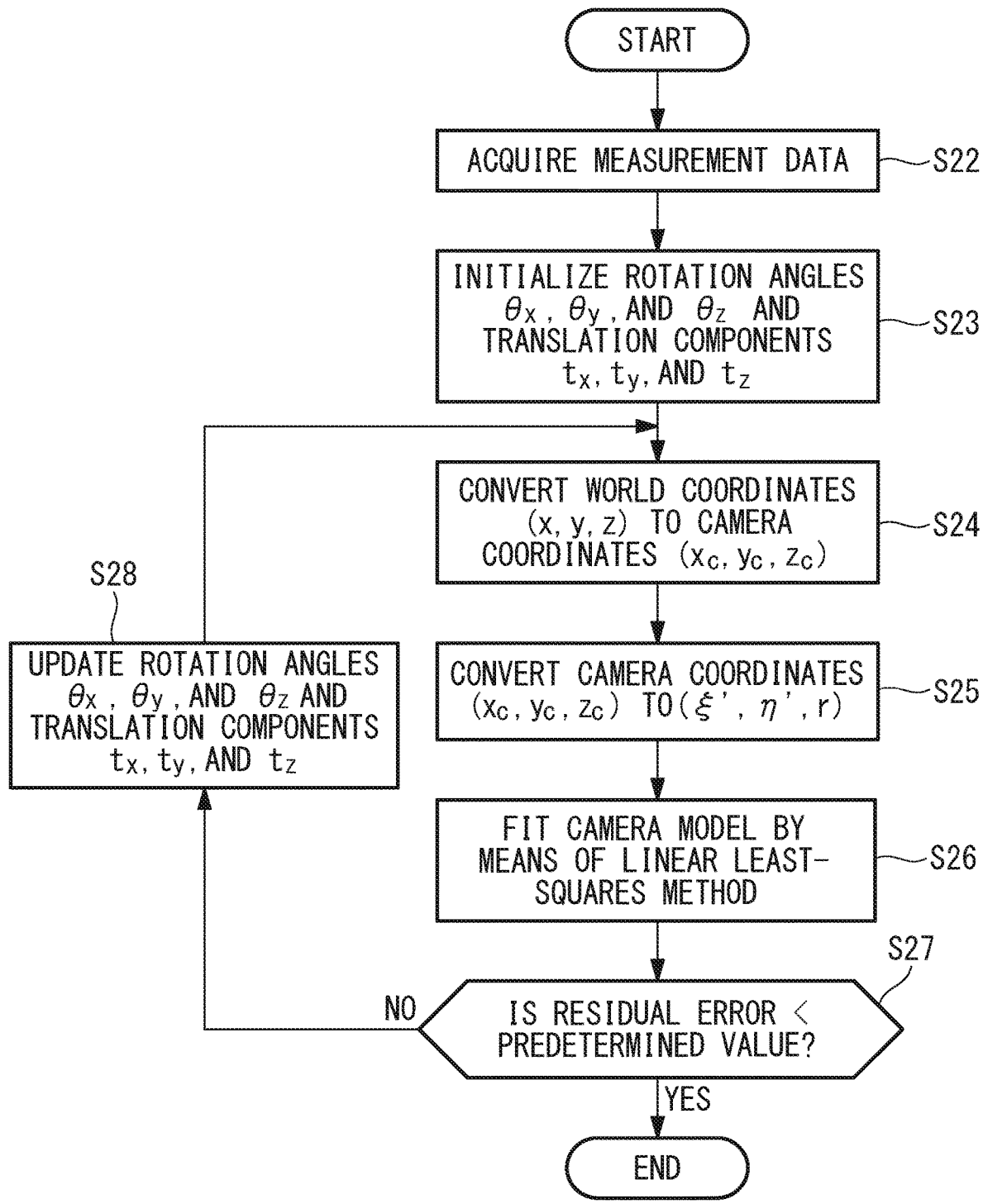
FIG. 6 is a diagram showing a flowchart of procedures for calibrating a camera by means of a calibration apparatus according to a second embodiment of the present invention.

Next, procedures for calibrating the camera 2 by using the camera calibration method according to the second embodiment will be described with reference to FIG. 6. As in the first embodiment, the measurement data representing the correspondence between the world coordinates $(x, y, z)$ and the pixel coordinates $(u, v)$ are acquired (step S22).

Next, the rotation angles $\theta_x$, $\theta_y$, and $\theta_z$ and the translation components $t_x$, $t_y$, and $t_z$ included in Eq. 10 are initialized (step S23). The initial values of the rotation angles $\theta_x$, $\theta_y$, and $\theta_z$ and the translation components $t_x$, $t_y$, and $t_z$ may be zero. Alternatively, in the case in which it is possible to estimate the rotation angles and translation of the camera 2 by using some method, the estimated results may be used as the initial values.

Next, the world coordinates $(x, y, z)$ of the measurement data are converted to the camera coordinates $(x_c, y_c, z_c)$ by means of Eq. 10 (step S24). The converted camera coordinates $(x_c, y_c, z_c)$ are converted to $(\xi', \eta', r)$ by means of Eq. 7 and Eq. 8 (step S25). The camera model in Eq. 9 is fitted to, by means of the linear least-squares method, all of the pixel coordinates $(u, v)$ in the measurement data and the converted coordinates $(\xi', \eta', r)$ (step S26). In the case in which the standard deviation of the residuals at this time is less than a predetermined value, the procedure is ended (step S27). In the case in which the standard deviation of the residuals is equal to or greater than the predetermined value, the rotation angles $\theta_x$, $\theta_y$, and $\theta_z$ and the translation components $t_x$, $t_y$, and $t_z$ are updated (step S28), and the procedure subsequently returns to step S24 (step S27).

This repeated optimization is executed by means of a general optimization algorithm such as a downhill simplex method. The rotation angles $\theta_x$, $\theta_y$, and $\theta_z$ and the translation components $t_x$, $t_y$, and $t_z$ in the case in which the residuals, which are an evaluation function, have been converted to the minimum value are the optimal rotation angles and translations. As has been described above, the camera calibration is ended after acquiring the individual coefficients of the camera model at the optimal rotation angles $\theta_x$, $\theta_y$, and $\theta_z$, the translation components $t_x$, $t_y$, and $t_z$, the rotation angle, and the translation.

In an image capturing apparatus that includes the camera 2 in which the camera model is installed, it is possible to utilize, as in the first embodiment, the camera model in which the camera parameters determined by using the camera calibration method according to this embodiment are set. In this case, the pixel coordinates are determined by converting the world coordinates to the camera coordinates by means of Eq. 10 and by subsequently applying the converted camera coordinates to the camera model in Eq. 9.

In this embodiment, the three rotation angles $\theta_x$, $\theta_y$, and $\theta_z$ and the three translation components $t_x$, $t_y$, and $t_z$ are optimized. When some of the optimized rotation angles $\theta_x$, $\theta_y$, and $\theta_z$ and translation components $t_x$, $t_y$, and $t_z$ are known, those may be fixed to the known values and excluded from the optimizing parameters. In that case, only the remaining one or multiple unknown parameters may be optimized. Because the number of optimizing parameters is reduced by doing so, it is possible to reduce the calculation time.

Note that definitions of the three rotation angles of the three-dimensional coordinates are arbitrary. This embodiment has been described by using the definitions that the three rotation angles are rotation angles about the x-, y-, and z-axes. It is needless to say that it is possible to apply the present invention to cases in which other definitions are employed.

As has been described above, with the camera calibration method according to this embodiment, it is possible to acquire a high-precision camera model even in the case in which the world coordinates do not coincide with the camera coordinates. Even in the case in which many camera parameters are required, such as a case of distortion, because the number of parameters for the repeated optimizing are limited to six, that is, the rotation angles and the translations, or less, there is no failure in optimizing the camera model and it is possible to considerably reduce the calculation time.

Next, a camera calibration apparatus 32 and a camera calibration method according to a third embodiment of the present invention will be described below with reference to the drawings. The camera calibration apparatus 32 according to this embodiment is applied to multi-view-camera calibration. Although calibration of three multi-view cameras 33, 34, and 35 will be described below as an example, it is possible to apply the present invention to calibration of a system involving another number of cameras.

Figure 7:
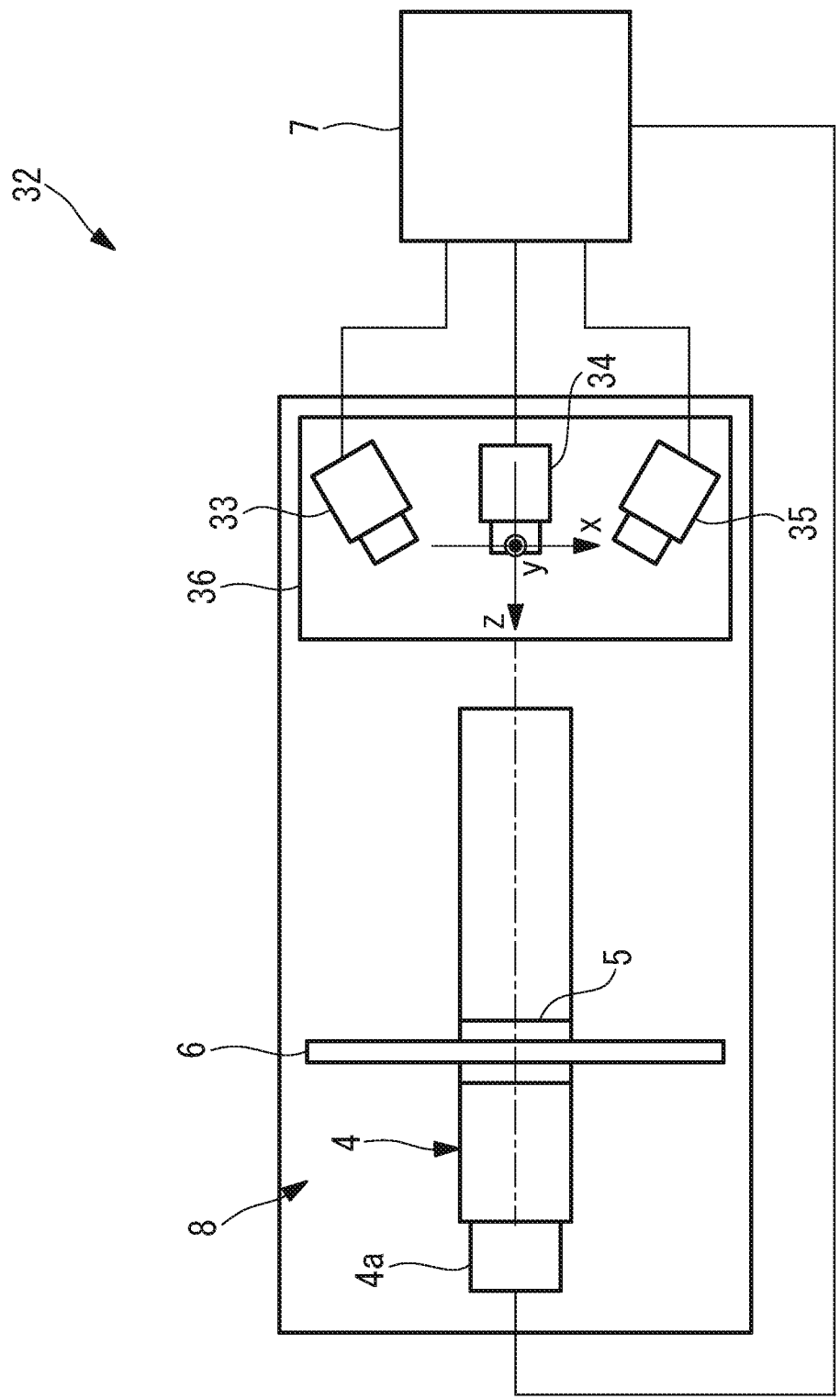
FIG. 7 is a plan view schematically showing a calibration apparatus according to a third embodiment of the present invention.

As shown in FIG. 7, in the camera calibration apparatus 32 according to this embodiment, the three cameras (optical apparatuses) 33, 34, and 35, which are the calibration targets, are disposed at the same positions as those in the use conditions of the multi-view cameras and are secured to a camera-securing base 36. In a manner in which the respective cameras 33, 34, and 35 can acquire an image of the calibration chart 6, the camera-securing base 36 is attached to the camera calibration apparatus 32. Other configurations, such as those of the calibration chart 6, the z-axis-movement stage 4, and the computer 7, are the same as those in FIG. 1, and the descriptions thereof will be omitted.

The operation of the camera calibration apparatus 32 according to this embodiment, thus configured, will be described below. The operation of the camera calibration apparatus 32 according to this embodiment is the same as that of the camera calibration apparatus 1 according to the first embodiment. By means of the measurement program shown in the flowchart in FIG. 3, the cameras 33, 34, and 35 automatically acquire images of the calibration chart 6 at a plurality of object distances, and the pixel coordinates of the grid points 11 of the calibration chart 6 are acquired from the acquired images. However, steps S2, S4, and S5 in the flowchart in FIG. 3 are executed for each of the three cameras 33, 34, and 35.

Subsequently, from the above-described measurement data of the individual cameras 33, 34, and 35, camera models of the individual cameras 33, 34, and 35 are determined. This procedure is the same as that in the first or second embodiment.

In an image capturing apparatus that includes the respective cameras 33, 34, and 35 in which the respective camera models are installed, it is possible to utilize, as in the first and second embodiments, the respective camera models in which the camera parameters determined by using the camera calibration apparatus 32 according to this embodiment are set.

Note that the measurement data of the respective multi-view cameras 33, 34, and 35 need not be measured at the same time. For example, the measurement program indicated in the flowchart in FIG. 3 may be separately and sequentially executed on the respective cameras 33, 34, and 35. When measuring the measurement data of the respective cameras 33, 34, and 35, the installation position of the z-axis-movement stage 4 in the camera calibration apparatus 32 may be changed for the purpose of making the calibration chart 6 directly face the respective cameras 33, 34, and 35, which are the measurement targets.

By ascertaining the amount by which the installation position of the z-axis-movement stage 4 is changed, it is necessary to create measurement data in which the ascertained amount of change is reflected in the world coordinates of the grid points 11 of the calibration chart 6. Because the multi-view cameras 33, 34, and 35 are disposed in a manner in which the cameras surround an observation region, such a camera calibration method is effective in the case in which there is a camera that is not capable of acquiring an image of the calibration chart 6 that is fixed in one direction.

As has been described above, with the camera calibration apparatus 32 and the camera calibration method according to this embodiment, it is possible to perform camera calibration by disposing the multi-view cameras 33, 34, and 35 at the same positions as those in the use conditions. It is possible to determine the pixel coordinates of the respective cameras 33, 34, and 35 that correspond to a single common world coordinate.

Figure 8:
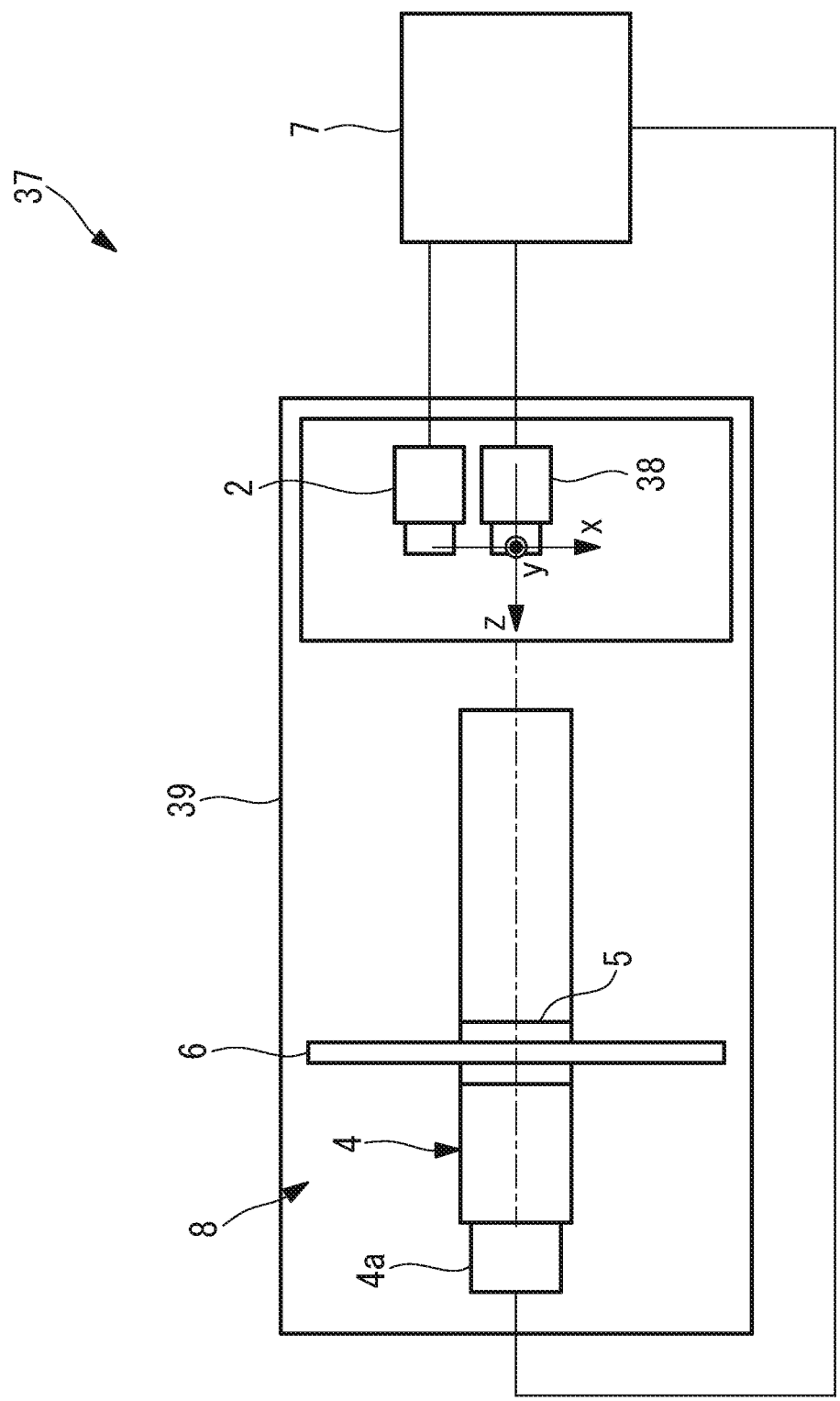
FIG. 8 is a plan view schematically showing a calibration apparatus according to a fourth embodiment of the present invention.

Next, a calibration apparatus according to a fourth embodiment of the present invention will be described below with reference to FIG. 8. The calibration apparatus according to this embodiment is a projector calibration apparatus 37, an image forming device (image-conversion device: not shown) such as a liquid crystal device and a projection optical system (optical system: not shown) are provided inside the projector calibration apparatus 37, and the projector calibration apparatus 37 is an apparatus for calibrating a projector (projection apparatus) 38 for externally projecting an image. In this embodiment, the projector 38 is employed as an example of the optical apparatus.

The projector calibration apparatus 37 is provided with: a base 39 that secures a projector 38, which is the calibration target; the z-axis-movement stage 4 provided in the base 39;

the calibration chart 6 that is secured to the movable portion 5 of the z-axis-movement stage 4; and the camera 2 that is disposed at a position adjacent to the projector 38 and that captures an image of the calibration chart 6. The camera 2 and the projector 38 are attached to the projector calibration apparatus 37 by installing the camera 2 and the projector 38 so that optical axes thereof are parallel to the z-axis of the projector calibration apparatus 37 and so that a predetermined position of the projector 38 is aligned with the coordinate origin.

Note that it is preferable that the image-acquisition area of the camera 2 encompass an image projection area of the projector 38. Other configurations, such as those of the calibration chart 6, the z-axis-movement stage 4, and the computer 7, are the same as those in FIG. 1. As the calibration chart 6 used in this embodiment, the chess board 10 in FIG. 2 can be exchanged with a plain screen. The computer 7 also has a function of causing the projector 38 to project a predetermined image by controlling the projector 38.

In order to calibrate the projector 38 by using the projector calibration apparatus 37 according to this embodiment, thus configured, the camera 2 is calibrated in a state in which the chess board 10 in FIG. 2 is installed so as to serve as the calibration chart 6. This procedure is the same as that of the first or second embodiment.

Subsequently, the calibration chart 6 is exchanged with the plain screen. Then, the pattern of the chess board 10 in FIG. 2 is projected onto the calibration chart 6 from the projector 38 via a projection optical system. At this time, in the pixel coordinates defined in an image forming device (not shown) in the projector 38, the pixel coordinates of the individual grid points 11 and 13 of the chess board 10 are already known.

In this state, as in the first embodiment, by means of the measurement program indicated in the flowchart in FIG. 3, images of the calibration chart 6 on which the pattern of the chess board 10 is projected are automatically acquired by the camera 2 at a plurality of object distances, and the pixel coordinates of the grid points 11 of the pattern of the chess board 10 are acquired from the acquired images.

Subsequently, from the acquired pixel coordinates (u, v) and the object distances z of the calibration chart 6, the world coordinates (x, y) of the grid points 11 of the pattern of the chess board 10 projected on the calibration chart 6 are determined by means of the camera model of the camera 2 calibrated by using the above-described procedure. Note that the camera model of the camera 2 according to the first or second embodiment of the present invention is configured in a manner in which the pixel coordinates (u, v) are determined from the world coordinates (x, y, z). Therefore, it is necessary to repeatedly perform optimization in order to determine the world coordinates (x, y) from the acquired pixel coordinates (u, v) and the object distances z. Because this method is publicly known, the description thereof will be omitted.

By means of the above-described procedures, the measurement data representing the correspondence between the pixel coordinates (u, v) of the projector 38 and the world coordinates (x, y, z) are obtained. The method for determining the camera parameters of the projector 38 from the obtained measurement data is the same as that of the first or second embodiment.

In the projector 38 in which the camera model is installed, it is possible to utilize, as in the first and second embodiment, the camera model in which the camera parameters of the projector 38 that are determined in this way are set.

In particular, when it is necessary to project an image without distortion, an image distortion that cancels out the distortion caused by the projection may be added in advance to the image formed by the image forming device of the projector 38. The procedure for determining the pixel coordinates of the distortion-corrected image is the same as that in the flowchart of the first embodiment shown in FIG. 5.

Note that the pattern projected by the projector 38 is not limited to the chess board 10. Patterns such as dot marks, with which it is possible to calculate the pixel coordinates of the feature points from the image captured by the camera 2, are also applicable. Alternatively, a method in which scattered individual pixels of the projector 38 are lit may be employed.

In addition, in this embodiment, the world coordinates (x, y) of the feature points that are projected by the projector 38 are measured by using the camera 2 that is calibrated in advance. The measurement results are installed in the image-acquisition device 18 instead of the calibration chart 6. Then, the image of the projected pattern is directly acquired, and thus, it is also possible to realize the same result by this method. It is possible to select another acquisition method so long as the correspondence between the world coordinates and the pixel coordinates can be made clear.

As has been described above, with the projector calibration apparatus 37 according to this embodiment, it is possible to calibrate the projector 38 by means of the camera model.

In the first to fourth embodiments of the present invention, the camera 2, 33, 34, 35, or the projector 38 is not limited to a catadioptric optical system. Even if a catadioptric optical system is employed, it is obvious that it is possible to apply the present invention thereto in consideration of a transformation associated with reflection, such as inversion of the coordinate system.

Multiple types of camera calibrations may be performed, each of which corresponding to changes in a setting of focus, zoom, aperture, or the like of the camera 2, 33, 34, 35, or the projector 38. By interpolating camera models, the camera model corresponding to an arbitrary setting may be determined.

The camera calibration may be performed by placing a device under a plurality of wavelengths from a light source. In a camera that captures images for separate wavelengths, camera models for separate wavelengths may be used.

In the optical apparatuses 2, 33, 34, 35, and 38 described in the first to fourth embodiments of the present invention, although the image-acquisition device 18 or an image forming device is employed as an example of the image-conversion device, there is no limitation thereto, and it suffices that the device mutually converts between an image and a video signal.

The above-described embodiment also leads to the following invention.

An aspect of the present invention is a calibration apparatus for an optical apparatus provided with a two-dimensional image-conversion device having a plurality of pixels and an optical system that forms an imaging relationship between the image-conversion device and a three-dimensional world coordinate space, the calibration apparatus including: a calibration-data acquiring portion that acquires calibration data indicating a correspondence between two-dimensional pixel coordinates of the image-conversion device and three-dimensional world coordinates of the world coordinate space; and a parameter calculating portion that, by fitting, to the calibration data acquired by the calibration-data acquiring portion, a camera model in which the two coordinate values of the two-dimensional pixel coordinates are expressed as a function of three coordinate values of the three-dimensional world coordinates, calculates parameters of the camera model, wherein, when a projection relationship between an angle of view θ and an image height y of the optical system is roughly expressed by a projection expression y=fP(θ) by using a projection focal distance f, the parameter calculating portion converts three-dimensional world coordinates (x, y, z) of the calibration data acquired by the calibration-data acquiring portion to two-dimensional coordinates (P(θ)cos φ, P(θ)sin φ) by using three-dimensional spherical coordinates (r, θ, φ) that are equal to the world coordinates, and, subsequently, by fitting a camera model in which the two coordinate values of the two-dimensional pixel coordinates are expressed as a function of two coordinate values of the two-dimensional coordinates (P(θ)cos φ, P(θ)sin φ), calculates the parameters of this camera model.

In the above-described aspect, the camera model may represent the two coordinate values of the two-dimensional pixel coordinates by means of a linear combination of two-dimensional vector functions having, as elements thereof, functions of the two coordinate values of the two-dimensional coordinates (P(θ)cos φ, P(θ)sin φ).

In the above-described aspect, the function of the two-dimensional coordinates (P(θ)cos φ, P(θ)sin φ) may be in the same form as that of a function that represents an imaging relationship between two-dimensional planes.

In the above-described aspect, the camera model may be expressed as a mathematical expression in which individual coefficients of the linear combination of the two-dimensional vector functions are replaced with polynomials in inverses of r in the three-dimensional spherical coordinates.

In the above-described aspect, the parameter calculating portion may fit the camera model to the calibration data by means of a linear least-squares method.

In the above-described aspect, the parameter calculating portion may fit the camera model to calibration data in which the three-dimensional world coordinates in the calibration data acquired by the calibration-data acquiring portion have been converted to rotated world coordinates by using one or more rotation angles among three rotation angles that represent the rotation of the world coordinates, and may determine one or more rotation angles at which residuals of the camera model are minimized.

In the above-described aspect, the parameter calculating portion may fit the camera model to calibration data in which the three-dimensional world coordinates in the calibration data acquired by the calibration-data acquiring portion have been converted to world coordinates that are translated by using one or more components among three translation components that represent the translation of the world coordinates, and may determine one or more translation components with which residuals of the camera model are minimized.

In the above-described aspect, the optical apparatus may be provided with a plurality of the image-conversion devices and the optical systems that form imaging relationships between the image-conversion devices and the three-dimensional world coordinate space, the calibration-data acquiring portion may acquire calibration data of the individual image-conversion devices and the optical systems, and the parameter calculating portion may fit the individual camera models to the calibration data of the individual image-conversion devices and the optical systems.

In the above-described aspect, the optical apparatus may be an image capturing apparatus, the image-conversion device may be an image-acquisition device, and the optical system may be an image-acquisition optical system.

In the above-described aspect, the optical apparatus may be a projection apparatus, the image-conversion device may be an image forming device, and the optical system may be a projection optical system.

Another aspect of the present invention is a calibration method including: a step of acquiring calibration data that represent, for an optical apparatus provided with a two-dimensional image-conversion device having a plurality of pixels and an optical system that converts an imaging relationship between the image-conversion device and the three-dimensional world coordinate space, a correspondence between two-dimensional pixel coordinates and three-dimensional world coordinates of the world coordinate space of the image-conversion device; and a step of, by fitting, to the acquired calibration data, a camera model in which two coordinate values of the two-dimensional pixel coordinates are expressed as a function of three coordinate values of the three-dimensional world coordinates, calculating parameters of the camera model, wherein, when a projection relationship between angle of view θ and an image height y of the optical system is roughly expressed by a projection expression y=fP(θ) by using a projection focal distance f, in the step of calculating the parameters, three-dimensional world coordinates (x, y, z) of the calibration data acquired in the step of acquiring the calibration data are converted to two-dimensional coordinates (P(θ)cos φ, P(θ)sin φ) by using three-dimensional spherical coordinates (r, θ, φ) that are equal to the world coordinates, and, subsequently, by fitting a camera model in which two coordinate values of the two-dimensional pixel coordinates are expressed as a function of two coordinate values of the two-dimensional coordinates (P(θ)cos φ, P(θ)sin φ), the parameters of the camera model are calculated.

In the above-described aspect, the camera model may represent the two coordinate values of the two-dimensional pixel coordinates by means of a linear combination of two-dimensional vector functions having, as elements thereof, functions of the two coordinate values of the two-dimensional coordinates (P(θ)cos φ, P(θ)sin φ).

In the above-described aspect, the function of the two-dimensional coordinates (P(θ)cos φ, P(θ)sin φ) may be in the same form as that of a function that expresses an imaging relationship between two-dimensional planes.

In the above-described aspect, the camera model may be expressed as a mathematical expression in which individual coefficients of the linear combination of the two-dimensional vector functions are replaced with polynomials in inverses of r in the three-dimensional spherical coordinates.

In the above-described aspect, in the step of calculating the parameters, the camera model may be fitted to the calibration data by means of a linear least-squares method.

In the above-described aspect, in the step of calculating the parameters, the camera model may be fitted to calibration data in which the three-dimensional world coordinates in the calibration data acquired in the step of acquiring the calibration data have been converted to rotated world coordinates by using one or more rotation angles among three rotation angles that represent the rotation of the world coordinates, and one or more rotation angles at which residuals of the camera model are minimized may be determined.

In the above-described aspect, in the step of calculating the parameters, the camera model may be fitted to calibration data in which the three-dimensional world coordinates in the calibration data acquired in the step of acquiring the calibration data have been converted to world coordinates that are translated by using one or more components among three translation components that represent the translation of the world coordinates, and one or more translation components with which residuals of the camera model are minimized may be determined.

Another aspect of the present invention is an optical apparatus in which a camera model is installed, the camera model including the parameters calculated by means of any one of the above-described calibration apparatuses.

The above-described aspect may be provided with a pixel-coordinate calculating portion that determines two coordinate values of the pixel coordinates from three coordinate values of the three-dimensional world coordinates by means of the camera model.

The above-described aspect may be provided with a distortion-corrected-image generating portion that generates a distortion-corrected image by determining pixel coordinates of an image acquired or formed by the image-conversion device by means of the camera model, the pixel coordinates corresponding to the world coordinates.

Another aspect of the present invention is an optical apparatus in which a camera model is installed, the camera model including, as the parameters, the rotation angles acquired by the above-described calibration apparatus.

The above-described aspect may be provided with a world-coordinates rotating portion that converts the world coordinates to rotated world coordinates by using the rotation angles.

Another aspect of the present invention is an optical apparatus in which a camera model is installed, the camera model including, as the parameters, the translation components acquired by the above-described calibration apparatus.

The above-described aspect may be provided with a world-coordinates translating portion that converts the world coordinates to translated world coordinates by using the translation components.

Another aspect of the present invention is an image capturing apparatus consisting of any one of the above-described optical apparatuses.

Another aspect of the present invention is a projection apparatus consisting of any one of the above-described optical apparatuses.

REFERENCE SIGNS LIST 1, 32 camera calibration apparatus (calibration apparatus)
2, 33, 34, 35 camera (image capturing apparatus, optical apparatus)
7 computer (parameter calculating portion)
8 calibration-data acquiring portion
14 image-acquisition optical system (optical system)
18 image-acquisition device (image-conversion device)
37 projector calibration apparatus (calibration apparatus)
38 projector (projection apparatus, optical apparatus)

The invention claimed is:

1. A calibration apparatus for an optical apparatus provided with a two-dimensional image-conversion device having a plurality of pixels and an optical system that forms an imaging relationship between the image-conversion device and a three-dimensional world coordinate space, wherein the calibration apparatus is configured to:
acquire calibration data indicating a correspondence between two-dimensional pixel coordinates of the image-conversion device and three-dimensional world coordinates of the world coordinate space; and
calculate parameters of a camera model in which two coordinate values of the two-dimensional pixel coordinates are expressed as a function of three coordinate values of the three-dimensional world coordinates by fitting the camera model to the acquired calibration data,
wherein, when a projection relationship between an angle of view $\theta$ and an image height y of the optical system is roughly expressed by a projection expression $y=fP(\theta)$ by using a projection focal distance f,
the calibration apparatus is configured to
convert three-dimensional world coordinates (x, y, z) of the acquired calibration data to two-dimensional coordinates ($P(\theta)\cos \varphi$, $P(\theta)\sin \varphi$) by using three-dimensional spherical coordinates (r, $\theta$, $\varphi$) that are equal to the world coordinates, and,
subsequently, by fitting a camera model in which the two coordinate values of the two-dimensional pixel coordinates are expressed as a function of two coordinate values of the two-dimensional coordinates ($P(\theta)\cos \varphi$, $P(\theta)\sin \varphi$), calculate the parameters of the camera model.

2. The calibration apparatus according to claim 1, wherein the camera model represents the two coordinate values of the two-dimensional pixel coordinates by means of a linear combination of two-dimensional vector functions having, as elements thereof, functions of the two coordinate values of the two-dimensional coordinates ($P(\theta)\cos \varphi$, $P(\theta)\sin \varphi$).

3. The calibration apparatus according to claim 2, wherein the function of the two-dimensional coordinates ($P(\theta)\cos \varphi$, $P(\theta)\sin \varphi$) is in the same form as that of a function that represents an imaging relationship between two-dimensional planes.

4. The calibration apparatus according to claim 2, wherein the camera model is expressed as a mathematical expression in which individual coefficients of the linear combination of the two-dimensional vector functions are replaced with polynomials in inverses of r in the three-dimensional spherical coordinates.

5. The calibration apparatus according to claim 1, wherein the calibration apparatus is configured to fit the camera model to the calibration data by means of a linear least-squares method.

6. The calibration apparatus according to claim 1, wherein the calibration apparatus is configured to fit the camera model to calibration data in which the three-dimensional world coordinates in the acquired calibration data have been converted to rotated world coordinates by using one or more rotation angles among three rotation angles that represent the rotation of the world coordinates, and determine one or more rotation angles at which residuals of the camera model are minimized.

7. The calibration apparatus according to claim 1, wherein the calibration apparatus is configured to fit the camera model to calibration data in which the three-dimensional world coordinates in the acquired calibration data have been converted to world coordinates that are translated by using one or more components among three translation components that represent the translation of the world coordinates, and determine one or more translation components with which residuals of the camera model are minimized.

8. The calibration apparatus according to claim 1,
wherein the optical apparatus is provided with a plurality of the image-conversion devices and the optical systems that form imaging relationships between the image-conversion devices and the three-dimensional world coordinate space, and the calibration apparatus is configured to acquire calibration data of the individual image-conversion devices and the optical systems, and fit the individual camera models to the calibration data of the individual image-conversion devices and the optical systems.

9. The calibration apparatus according to claim 1,
wherein the optical apparatus is an image capturing apparatus,
the image-conversion device is an image-acquisition device, and
the optical system is an image-acquisition optical system.

10. The calibration apparatus according to claim 1,
wherein the optical apparatus is a projection apparatus,
the image-conversion device is an image forming device, and
the optical system is a projection optical system.

11. A calibration method comprising:
acquiring calibration data that represent, for an optical apparatus provided with a two-dimensional image-conversion device having a plurality of pixels and an optical system that converts an imaging relationship between the image-conversion device and the three-dimensional world coordinate space, a correspondence between two-dimensional pixel coordinates and three-dimensional world coordinates of the world coordinate space of the image-conversion device; and
calculating parameters of a camera model in which two coordinate values of the two-dimensional pixel coordinates are expressed as a function of three coordinate values of the three-dimensional world coordinates by fitting the camera model to the acquired calibration data,
wherein, when a projection relationship between an angle of view θ and an image height y of the optical system is roughly expressed by a projection expression y=fP(θ) by using a projection focal distance f,
in the calculating the parameters,
three-dimensional world coordinates (x, y, z) of the calibration data acquired in the acquiring the calibration data are converted to two-dimensional coordinates (P(θ)cos φ, P(θ)sin φ) by using three-dimensional spherical coordinates (r, θ, φ) that are equal to the world coordinates, and, subsequently, by fitting a camera model in which two coordinate values of the two-dimensional pixel coordinates are expressed as a function of two coordinate values of the two-dimensional coordinates (P(θ)cos φ, P(θ)sin φ), the parameters of the camera model are calculated.

12. The calibration method according to claim 11, wherein the camera model represents the two coordinate values of the two-dimensional pixel coordinates by means of a linear combination of two-dimensional vector functions having, as elements thereof, functions of the two coordinate values of the two-dimensional coordinates (P(θ)cos φ, P(θ)sin φ).

13. The calibration method according to claim 12, wherein the function of the two-dimensional coordinates (P(θ)cos φ, P(θ)sin φ) is in the same form as that of a function that expresses an imaging relationship between two-dimensional planes.

14. The calibration method according to claim 12, wherein the camera model is expressed as a mathematical expression in which individual coefficients of the linear combination of the two-dimensional vector functions are replaced with polynomials in inverses of r in the three-dimensional spherical coordinates.

15. The calibration method according to claim 11, wherein, in the calculating the parameters, the camera model is fitted to the calibration data by means of a linear least-squares method.

16. The calibration method according to claim 11, wherein, in the calculating the parameters, the camera model is fitted to calibration data in which the three-dimensional world coordinates in the calibration data acquired in the acquiring the calibration data have been converted to rotated world coordinates by using one or more rotation angles among three rotation angles that represent the rotation of the world coordinates, and one or more rotation angles at which residuals of the camera model are minimized are determined.

17. The calibration method according to claim 11, wherein, in the calculating the parameters, the camera model is fitted to calibration data in which the three-dimensional world coordinates in the calibration data acquired in the acquiring the calibration data have been converted to world coordinates that are translated by using one or more components among three translation components that represent the translation of the world coordinates, and one or more translation components with which residuals of the camera model are minimized are determined.

18. An optical apparatus in which a camera model is installed, the camera model including the parameters calculated by means of the calibration apparatus according to claim 1.

19. The optical apparatus according to claim 18, wherein the optical apparatus is configured to determine two coordinate values of the pixel coordinates from three coordinate values of the three-dimensional world coordinates by means of the camera model.

20. The optical apparatus according to claim 18, wherein the optical apparatus is configured to generate a distortion-corrected image by determining pixel coordinates of an image acquired or formed by the image-conversion device by means of the camera model, the pixel coordinates corresponding to the world coordinates.

21. A calibration apparatus for an optical apparatus provided with a two-dimensional image-conversion device having a plurality of pixels and an optical system that forms an imaging relationship between the image-conversion device and a three-dimensional world coordinate space, comprising:
a calibration chart;
a stage that changes a distance between the optical apparatus and the calibration chart; and
a computer that is connected to the optical apparatus and the stage,
wherein the computer is configured to perform processes of:
acquiring images of the calibration chart while changing the distance between the optical apparatus and the calibration chart by controlling the stage and the optical apparatus;
acquiring calibration data indicating a correspondence between two-dimensional pixel coordinates of the image-conversion device and three-dimensional world coordinates of the world coordinate space on the basis of the acquired images of the calibration chart; and
calculating parameters of a camera model in which two coordinate values of the two-dimensional pixel coordinates are expressed as a function of three coordinate values of the three-dimensional world coordinates by fitting the camera model to the acquired calibration data, wherein, in the calculating parameters, when a projection relationship between an angle of view θ and an image height y of the optical system is roughly expressed by a projection expression y=fP(θ) by using a projection focal distance f, the computer is configured to perform processes of:

converting three-dimensional world coordinates (x, y, z) of the acquired calibration data to two-dimensional coordinates (P(θ)cos φ, P(θ)sin φ) by using three-dimensional spherical coordinates (r, θ, φ) that are equal to the world coordinates; and subsequently, by fitting a camera model in which the two coordinate values of the two-dimensional pixel coordinates are expressed as a function of two coordinate values of the two-dimensional coordinates (P(θ)cos φ, P(θ)sin φ), calculating the parameters of the camera model.

22. The calibration apparatus according to claim 21, wherein the camera model represents the two coordinate values of the two-dimensional pixel coordinates by means of a linear combination of two-dimensional vector functions having, as elements thereof, functions of the two coordinate values of the two-dimensional coordinates (P(θ)cos φ, P(θ)sin φ), and the camera model is expressed as a mathematical expression in which individual coefficients of the linear combination of the two-dimensional vector functions are replaced with polynomials in inverses of r in the three-dimensional spherical coordinates.

* * * * *